United States Patent [19]

Kells

[11] 3,823,661

[45] July 16, 1974

[54] APPARATUS FOR THAWING FOOD
[75] Inventor: Edward L. Kells, Batavia, Ill.
[73] Assignee: Dover Corporation, New York, N.Y.
[22] Filed: Sept. 22, 1972
[21] Appl. No.: 291,311

[52] U.S. Cl. ................................................ 99/468
[51] Int. Cl. ............................................ A23l 1/00
[58] Field of Search ............ 99/470, 472, 480, 467, 99/468, 473, 474, 475, 481, 483; 426/524

[56] References Cited
UNITED STATES PATENTS
3,505,490   4/1970   Gorn .................................... 99/483
3,586,516   6/1971   Terc ..................................... 99/483
3,604,334   9/1971   Ballentine ............................ 99/483

Primary Examiner—Robert W. Jenkins
Attorney, Agent, or Firm—Darbo, Robertson & Vandenburgh

[57] ABSTRACT

Relatively low pressure steam is forced through an area within which lumps of frozen vegetables are located. Initally, steam is supplied at a relatively high rate, with the rate being reduced after the ice has been thawed from the surface of the vegetables. The condensate along with any other liquids present are withdrawn from the area in which the vegetables are located. As the surface ice is removed from the vegetables, the steam supply is automatically reduced.

7 Claims, 4 Drawing Figures

PATENTED JUL 16 1974 3,823,661
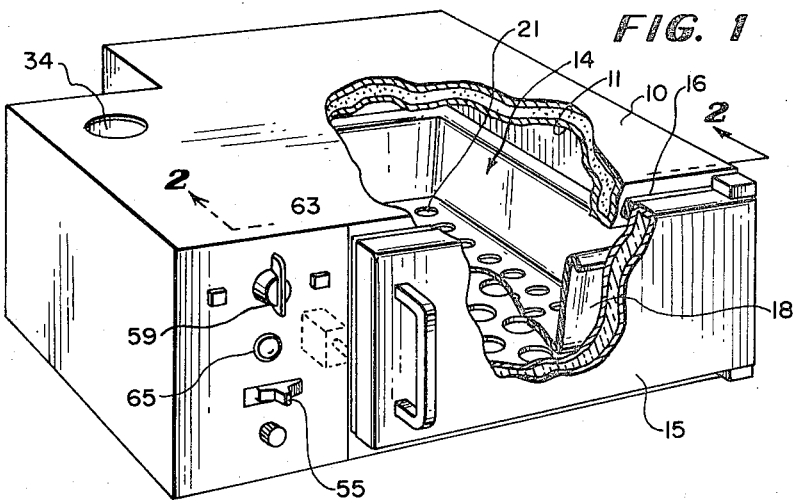
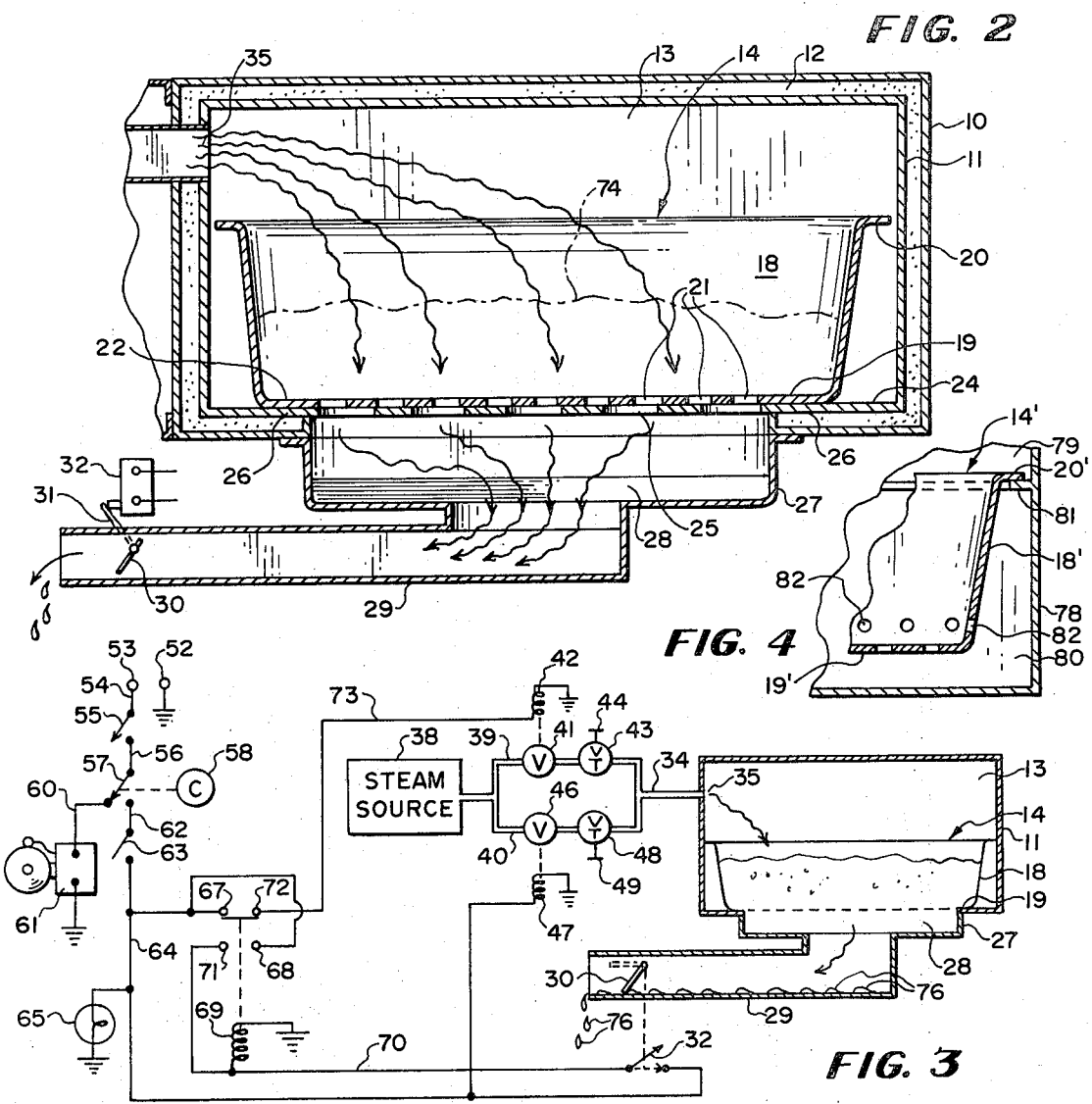

APPARATUS FOR THAWING FOOD

BACKGROUND AND SUMMARY OF THE INVENTION

The present invention is primarily concerned with situations, such as that found in hotels, restaurants, airline kitchens, etc., where food is prepared in large quantities. For obvious reasons such kitchens have gone to the use of frozen vegetables. Frozen vegetables make an extremely palatable product when they are properly thawed, but the desirable characteristics can be severely damaged by careless thawing. Since the cooks in the kitchens have numerous other jobs to do, there is a great need for an automatic apparatus to thaw the frozen vegetables in a manner such that the desirable characteristics will be optimumly maintained.

The frozen vegetable, such as peas, broccoli, brussel sprouts, beans, cauliflower and the like are purchased in packages of predetermined size, two and one-half pounds being a common size for a restaurant pack. They are in a block, but it is not like a solid block of ice. It is frangible and has openings therethrough.

One prior art thawing procedure is to place such a block in boiling water. This is a relatively slow procedure and has the decided disadvantage that a significant portion of vitamins is dissolved out of the vegetables. If the vegetables are not removed promptly upon thawing they tend to resemble vegetables that have been held in a steam table, an undesirable characteristics. Some of these disadvantages are overcome by putting the frozen vegetables in a closed plastic bag before emersion in the water. While this retains the vitamins, it has the added disadvantage that the heat transfer is greatly reduced so that the thawing time is substantially increased. In a busy kitchen it is desirable to be able to thaw the vegetable in the shortest possible time. Thus only small quantities need to be kept on hand at one time to retain their freshness, and when the demand increases it can be quickly satisfied by thawing more vegetables.

Another prior art process is to thaw the vegetables in a closed chamber in which a substantial steam pressure is maintained. By raising the steam pressure the temperature is raised accordingly. As compared to the present invention which uses relatively low pressure steam, this prior art process has the initial disadvantage that the equipment must be more sturdily constructed to handle the steam pressures involved. This is particularly true of the door construction involved. Another disadvantage is that there are problems should the operator desire to examine the condition of the vegetables while the thawing cycle is going on. To do this, the steam pressure must be dropped so that the chamber can be opened and after the vegetables have been examined the steam pressure must again be raised to the operating point. However, perhaps the most important disadvantage is that control of the length of the thawing cycle is extremely critical. Because the temperatures are relatively high, only a short period of overexposure can result in substantial overcooking and a short period of underexposure likewise can result in substantial undercooking. Since the quantities of frozen food are not always identical in all of their characteristics, just such factors can change the optimal thawing cycle for a particular batch. Some such prior art steam cookers also use jets of steam to physically stir the atmosphere about the food being thawed.

In the present invention the steam is caused to flow along a path with the lumps of vegetables being interposed in that path in a manner such that the steam necessarily must flow in and about the lumps of vegetables as it moves along the path. Relatively low pressure steam is employed thus giving a gentle thawing which is not unduly critical as to time. At the same time, the thawing cycle can be as short as with any of the prior art procedures. This greatly simplifies the equipment requirements. For example, the steam generator can be a boiler which operates nearly at atmospheric pressure. The cabinet construction, particularly the door, can be of the simplest kind and need not have any special requirements to withstand internal pressures.

Other objects and advantages will become apparent from the following description.

DESCRIPTION OF THE DRAWING

FIG. 1 is a perspective view, with a portion broken away, of an embodiment of the invention;

FIG. 2 is a section as seen at line 2—2 of FIG. 1;

FIG. 3 is a schematic illustration of the embodiment with the automatic control therefor; and FIG. 4 is a partial section (viewed as in FIG. 2) of an alternative embodiment.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The embodiment illustrated in FIG. 1 is devised in a manner such that two or more of the units may be stacked on top of each other to provide a thawing array having the capacity necessary for a particular kitchen. The cabinet comprises an outer shell 10 and an inner shell 11. The cabinet has an internal opening or chamber 13 of a size to receive a pan, generally 14. The side walls of the cabinet are sufficiently close to the pan so that its position in the cabinet is relatively fixed or consistent. There is a hinged door 15 providing access to opening 13 for the insertion and removal of pan 14. Because of the relatively low steam pressures involved, the door can be held closed by no more than a magnetic gasket 16 although in some embodiments, a simple latch will be employed. The pan 14 has sides 18 and a bottom 19. The top of the pan is open and has a flange 20 thereabout. The pan bottom has a plurality of openings 21 centrally disposed therein. Between the openings 21 and the sides 18 of the pan is an imperforate area 22.

The bottom of the internal opening 13 is defined by a base wall 24 having openings 25 therethrough. These openings are positioned so that they will lie below the central perforate portion of the pan when the pan is in the cabinet. Thus there is an imperforate area 26 of the bottom wall 24 in contact with the imperforate area 22 of the pan bottom 19. This provides a fluid tight seal. There is a receiver 27 closing off the area below the openings 25. Receiver 27 defines a chamber 28. When a pan is in place, the only fluid communication between the internal opening or chamber 13 and the chamber 28 is through the registry of the openings 21 and 25. An exhaust duct 29 extends from chamber 28 to atmosphere. A pivoted vane 30 extends across duct 29. It has an arm 31 that actuates a normally closed switch 32 to open the switch when the vane is pushed upwardly by the comparatively rapid escape of steam through the duct.

The cabinet has a steam input connection 34. This communicates with the interior of the cabinet at 35. The input connections 34 are so arranged that, when the cabinets are stacked one above the other, there is an input connection from each cabinet to the next. Thus the connection 34 extends vertically through the cabinet. There is a similar arrangement for having a common exhaust connection for the collection of condensate, but this is not illustrated in the drawing.

Steam is supplied from a common source 38, such as a low pressure steam boiler. There are two passageways 39 and 40 extending between the source 38 and the steam connection 34. In passageway 39 there is a valve 41 operated by a solenoid 42 and a throttle valve 43. Throttle valve 43 may be adjusted by means of a handle 44. In passageway 40 is a valve 46 opened by means of a solenoid 47 and a throttle valve 48. Valve 48 is adjusted by means of a handle 49.

Electric power is supplied to connections 52 and 53. A wire 54 extends from connection 53 to the main power switch 55. A wire 56 extends from switch 55 to a single-ple, double-throw switch 57. Switch 57 is moved from the position illustrated to the other pole when a clock 58 is running. Clock 58 is set by means of a handle 59.

One pole of switch 57 is connected by a wire 60 to a signaling device such as a bell or a buzzer 61. A wire 62 connects the other pole of switch 57 to a door operated switch 63. Switch 63 is closed when door 15 of the cabinet is closed. A wire 64 connects switch 63 to a lamp 65 which signifies that the apparatus is in operation. Wire 64 also connects to solenoid 47, to switch 32 and to contacts 67 and 68 of a double-pole, double-throw switch actuated by a solenoid 69. A wire 70 connects switch 32, solenoid 69 and contact 71. Contact 72 is connected by a wire 73 to solenoid 42.

FIG. 3 illustrates the condition of the control apparatus preparatory to a thawing operation. It may be desirable, although not necessary, for the block of frozen vegetables to be broken into a plurality of pieces before it is put into pan 14 for thawing. In any event, there will be lumps, chunks or blocks of the frozen food in the pan as suggested by the line 74. The pan is placed into the cabinet and the door closed. This closes switch 63. The knob 59 is then turned to set the clock 58 for the desired length of the thawing cycle. This moves the switch 57 so that there is an electrical connection between wires 56 and 62. The main switch 55 is then closed. This supplies power to solenoid 47 which opens valve 46. Valve 48 will have been adjusted so as to provide a relatively small amount of steam flow through passageway 40 into the thawing chamber 13.

The electrical power also passes from wire 64 through the switch contactor between contacts 67 and 72 and wire 73 to energize solenoid 42. This opens valve 41 and permits the flow of steam through passageway 39 into the thawing chamber. Passageway 39 is a supplemental flow. It is regulated by valve 43 so that at the start of the thawing cycle the steam flow is comparatively high. The path of steam flow to the exhaust is such that it passes through the lumps or chunks of frozen vegetables in pan 14 from chamber 13 to chamber 28. Because of the frozen condition of the vegetables and the ice on the surface thereof the initial steam flow is mainly condensed and falls down into duct 29 as a condensate 76. The condensate also includes all other free liquid which appears during the thawing process.

As the thawing progresses, the surface ice on the vegetables disappears and the surfaces of the vegetables become somewhat warm. The effect of this is that less of the steam entering chamber 13 is condensed and more of the steam appears in exhaust duct 29. As the flow of steam through exhaust duct 29 becomes larger it causes an upward movement of vane 30. Ultimately this movement is sufficient so as to close switch 32. This situation is illustrated in dotted lines in FIG. 3. When switch 32 closes it energizes solenoid 39 and the contactor connected thereto moves from contacts 67, 72 to contacts 68, 71. This deenergizes solenoid 42 so that valve 41 closes. It also establishes a holding circuit across solenoid 69 so that the solenoid remains energized even though switch 32 may thereafter open.

The closing of valve 41 blocks passageway 39 and only the steam flowing through passageway 40 now is delivered to chamber 13. Throttle valve 48 will have been adjusted so that the amount of steam flow now is approximately only sufficient to supply only the amount of steam that will be condensed in the process of warming the vegetables. To put it another way, there should be little exhaust steam now coming from duct 29. This low steam flow washes gently over the vegetables and removes the noncondensibles, the gases that are released by the thawing operation (e.g., mainly air).

This constant washing of the atmosphere about the vegetables as the steam passes from chamber 13 to chamber 28 (during both parts of the thawing cycle) is extremely effective in thawing at the greatest possible speed. The thawing temperature during this latter part of the thawing cycle is low, particularly as compared to pressurized units, since the steam is at a pressure only little above atmospheric and is mainly condensing. As it condenses on the vegetables it also produces good thermal conductivity therewith.

When the clock 58 runs out, the thawing cycle is ended by the movement of switch 57 from wire 62 to wire 60. Both steam valves are now closed. Through wire 60, alarm 61 is energized to advise the operator that the cycle is over and the thawed vegetables are ready to be removed.

The steam boiler 38 can be relatively simple since the steam requirements are not very high. Not a lot of steam is used and what is employed is at comparatively low pressure. I believe that the steam pressures in chamber 13 should never rise above one-half pound per square inch and even in the initial thawing cycle will be normally not over about one to two inches of water. These pressures cannot rise particularly high because of the fact that duct 29 communicates with atmosphere. This significantly reduces the temperature over that employed in pressurized thawing units.

FIG. 4 illustrates an alternative method of dividing the internal opening of the inner shell 78 into two chambers 79 and 80 between which the steam is forced to flow along a path through the vegetables. Here the flange 20' of the pan 14' rests on a ledge 81 extending entirely about the periphery of the shell 78 (including the door). This provides a fluid tight seal between chambers 79 and 80 except for the openings 21' in the bottom of the pan and the openings 82 in the side walls 18' of the pan. If side wall openings 82 are employed they should be comparatively few in number and close to the bottom 19' of the pan. Thus when steam is introduced into one of the chambers, e.g., lower chamber 80, and exhausted from the other chamber, e.g., upper chamber 79, the steam is forced to flow along a path through the vegetables with the washing action that imparts good heat transfer.

I claim:

1. An apparatus for thawing one or more lumps of frozen vegetable, said apparatus comprising:
   a pan having walls including sides and a bottom with openings in the bottom, and mainly in the bottom, thereof;
   cabinet means of a size to hold said pan in a given area therein, said cabinet means contacting said pan when said pan is positioned in said area to block fluid communication between the space inside and the space outside of said walls except through said openings, one of said spaces communicating with atmosphere; and
   means for supplying low pressure steam to the other of said spaces.

2. An apparatus for thawing one or more lumps of frozen vegetable and used in conjunction with a source of steam, said apparatus comprising:
   a pan having walls including sides and a bottom with openings in the bottom, and mainly in the bottom, thereof; and
   cabinet means having an internal opening of a size to hold said pan in a given location therein, said cabinet means and said pan contacting each other when said pan is in said location with the pan thereby dividing said cabinet means into two chambers whose only fluid communication with each other is through said pan openings, said cabinet means having a connection adapted to be connected to said source, said connection communicating with one of said chambers, said cabinet means having an exhaust duct communicating with the other chamber.

3. An apparatus as set forth in claim 2, including automatic steam control means, including valve means, between said connection and said one chamber for initially supplying steam at a relatively high rate of steam in a thawing cycle and thereafter at a relatively low rate.

4. An apparatus as set forth in claim 3, wherein said control means includes a steam flow sensor in said duct for determining the extent to which steam is exhausting through said duct and operating said valve means to reduce the flow to the one chamber when the exhaust steam is greater than a given amount.

5. An apparatus as set forth in claim 4, wherein said control means includes a timer to shut off the flow of steam after a given period of time.

6. An apparatus as set forth in claim 3, wherein there are two passageways between said connection and said one chamber, said valve means including an automatic valve and an adjustable throttle valve in one passageway and an automatic valve and an adjustable throttle valve in the other passageway.

7. An apparatus as set forth in claim 2, wherein said pan bottom has an unperforated area about the periphery thereof with all the pan openings being within said unperforated area, said cabinet means having portions contacting said pan completely around said unperforated area and having means defining an opening communicating within the area defined by said portions.

* * * * *